United States Patent [19]

Iverson, Jr. et al.

[11] Patent Number: 5,930,950
[45] Date of Patent: Aug. 3, 1999

[54] METHOD OF INHIBITING THE FORMATION OF CRYSTALLINE MINERAL DEPOSITS IN SOIL

[75] Inventors: Thomas Iverson, Jr., Yakima; Joyce Prindle, Olympia, both of Wash.

[73] Assignee: CH20 Incorporated, Olympia, Wash.

[21] Appl. No.: 08/910,680

[22] Filed: Aug. 13, 1997

Related U.S. Application Data

[63] Continuation of application No. 08/532,585, filed as application No. PCT/US94/12837, Nov. 8, 1994, abandoned, which is a continuation-in-part of application No. 08/052,065, Apr. 22, 1993, Pat. No. 5,369,099, said application No. 08/532,585, Dec. 8, 1995, is a continuation-in-part of application No. 08/311,067, Sep. 23, 1994, Pat. No. 5,422,348, which is a continuation-in-part of application No. 08/052,065, Apr. 22, 1993, Pat. No. 5,369,099.

[51] Int. Cl.$^6$ ................................................ A01G 25/00
[52] U.S. Cl. ............................ 47/58.1; 405/36; 71/903
[58] Field of Search ............................ 47/58, DIG. 10; 106/900; 504/113; 71/903, 77; 405/36

[56] References Cited

U.S. PATENT DOCUMENTS

| | | | |
|---|---|---|---|
| 3,149,151 | 9/1964 | Schiefer et al. | 260/502 |
| 3,150,081 | 9/1964 | Haslam | 210/58 |
| 3,214,454 | 10/1965 | Blaser et al. | 260/429.9 |
| 4,649,025 | 3/1987 | Hwa et al. | 422/15 |
| 4,802,990 | 2/1989 | Innskeep, Jr. | 210/699 |
| 5,106,406 | 4/1992 | Sylling et al. | 71/77 |
| 5,171,477 | 12/1992 | Kreh | 252/389.23 |
| 5,369,099 | 11/1994 | Iverson, Jr. et al. | 514/108 |
| 5,422,348 | 6/1995 | Iverson, Jr. et al. | 514/108 |

OTHER PUBLICATIONS

Hartmann, Hudson and Dale Kester. Plant Progagtion. New Jersey:Prentice–Hall, Inc. pp. 44–45, 1983.

*Primary Examiner*—Douglas W. Robinson
*Assistant Examiner*—Melissa L. Kimball
*Attorney, Agent, or Firm*—Delbert J. Barnard

[57] ABSTRACT

The present invention provides an improved method for growing a plant in soil while irrigating the soil with water which contains deposit forming minerals. According to the present invention, an effective amount of 1-hydroxyethane 1,1-diphosphonic acid (HEDPA) is admixed with irrigation water and applied to the soil in which the plant is growing.

4 Claims, 2 Drawing Sheets

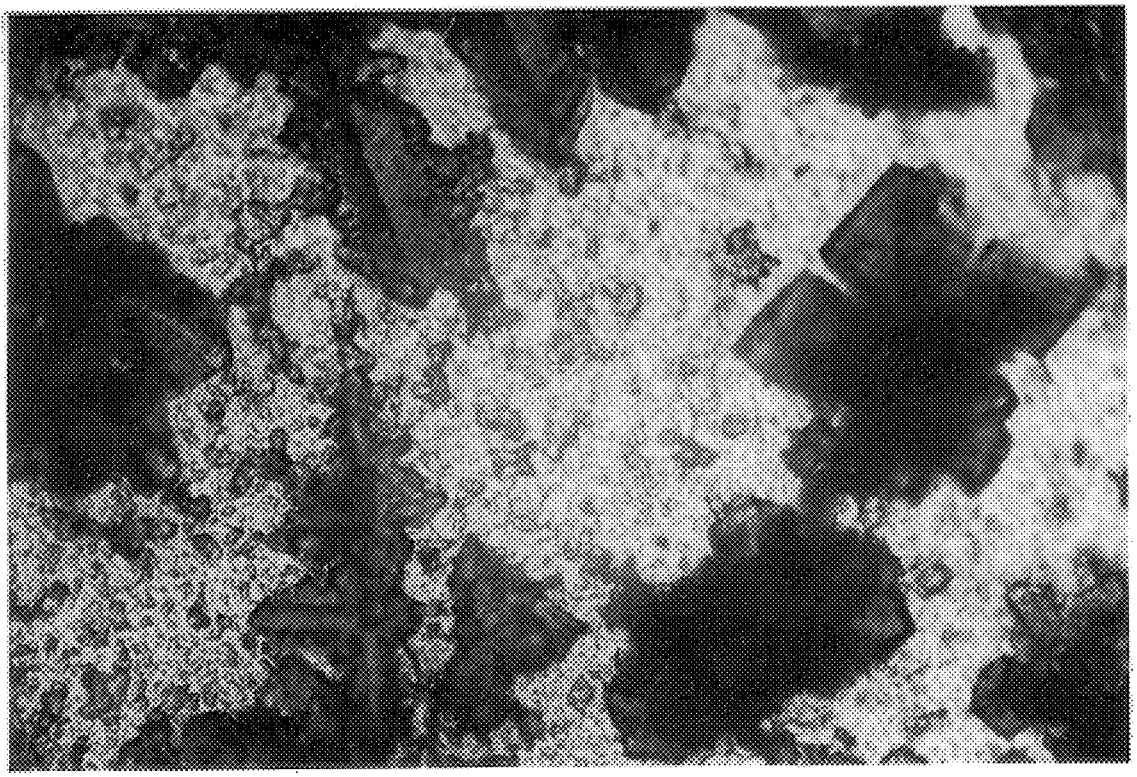
FIG. 1
FIG. 2
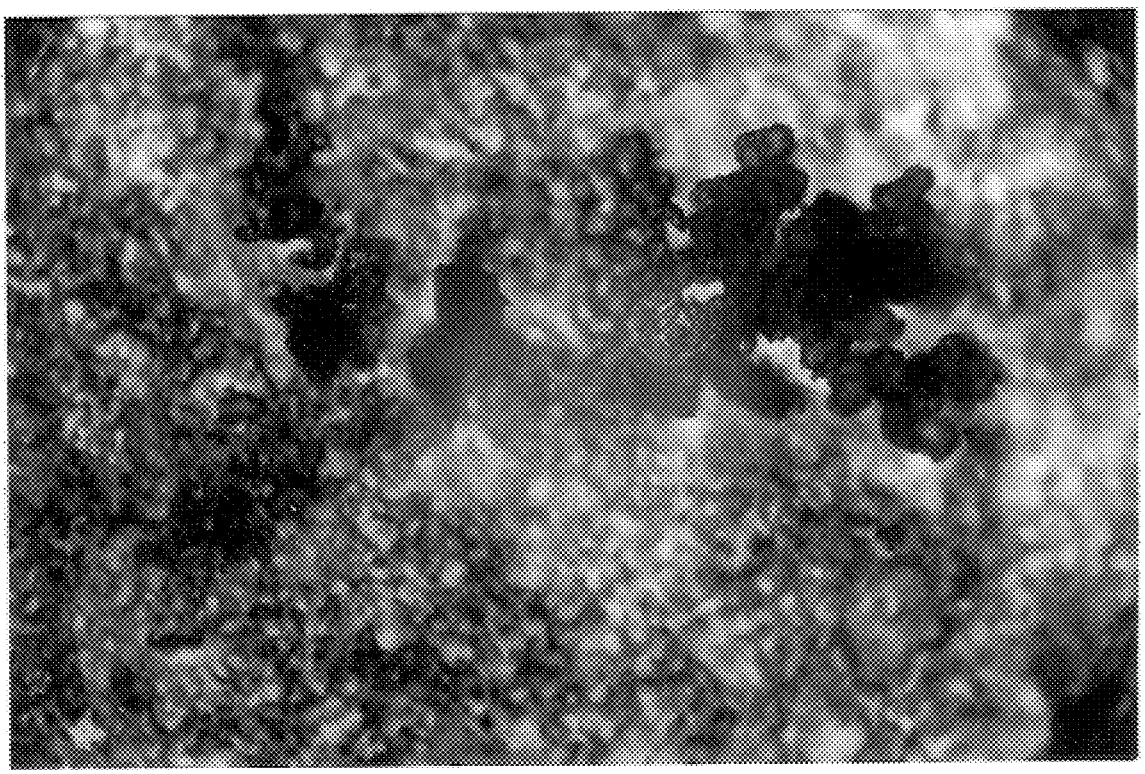

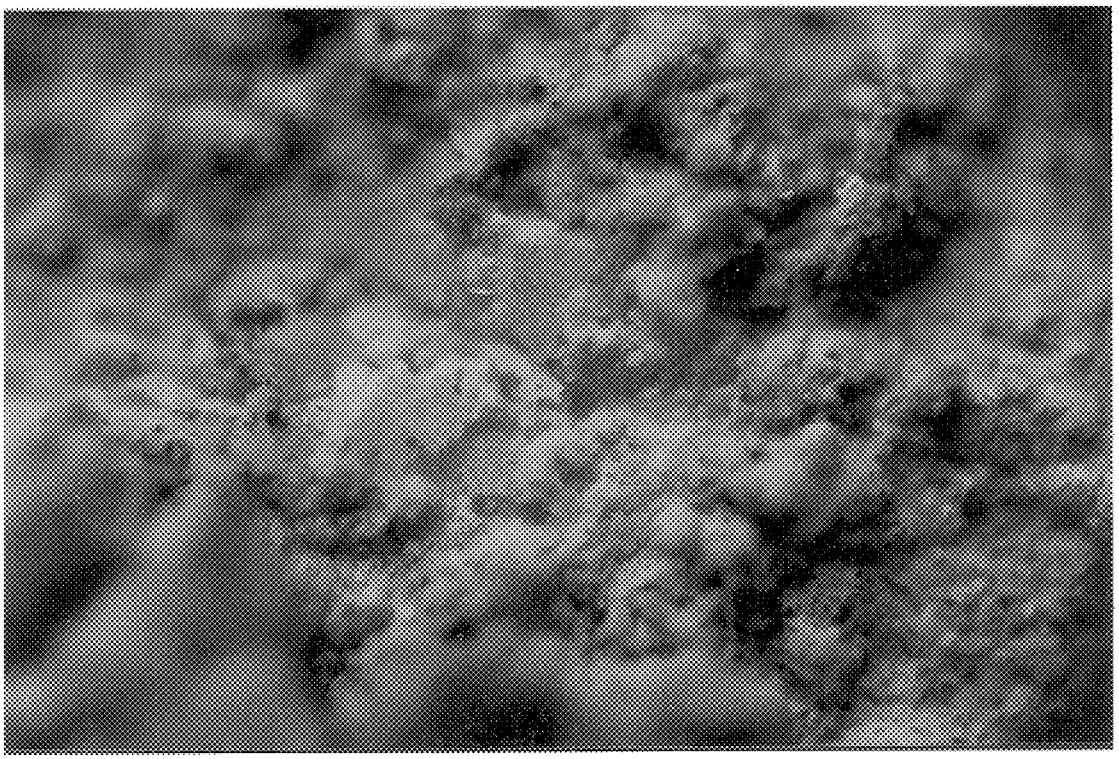
FIG. 3
FIG. 4
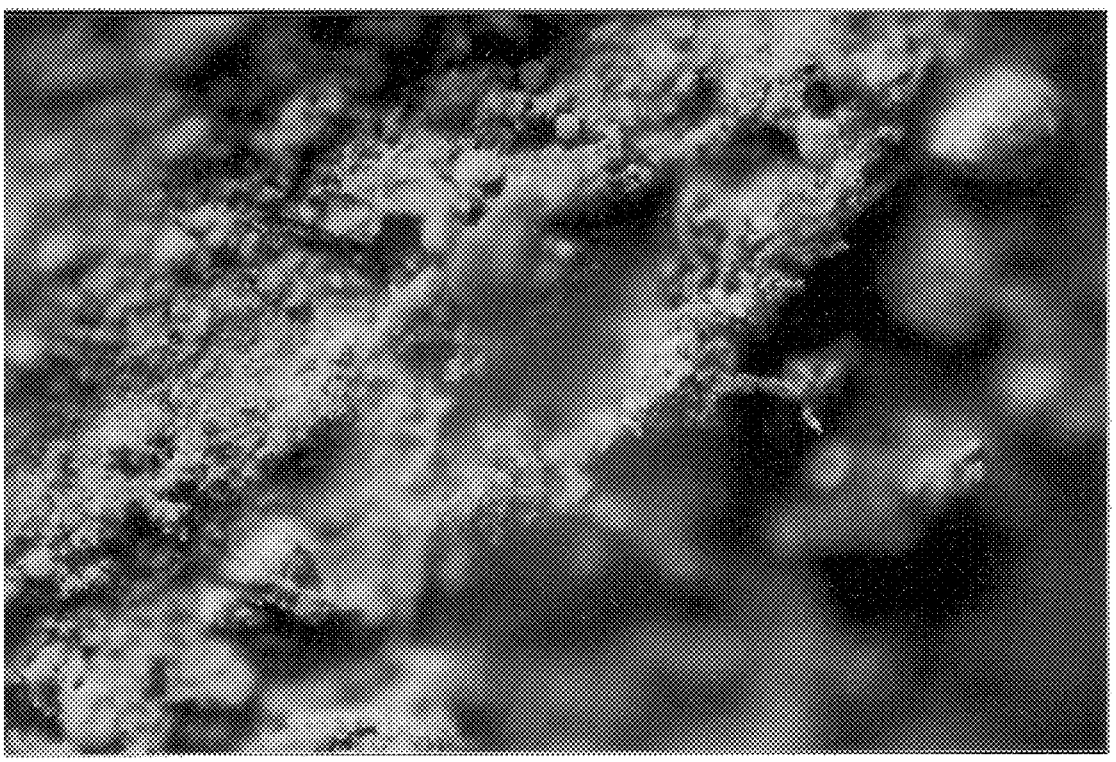

METHOD OF INHIBITING THE FORMATION OF CRYSTALLINE MINERAL DEPOSITS IN SOIL

This application is a continuation of Ser. No. 08/532,585, filed Dec. 8, 1995, now abandoned, which is a 371 of PCT/US94/12837 Nov. 8, 1994, which is a continuation-in-part of U.S. application Ser. No. 08/052,065, filed Apr. 22, 1993, and now U.S. Pat. No. 5,369,099, granted Nov. 29, 1994. Application Ser. No. 08/532,585, Dec. 8, 1995 is also a continuation in part of U.S. application Ser. No. 08/311,067, filed Sep. 23, 1994, now U.S. Pat. No. 5,422,348, which is a continuation-in-part of U.S. application Ser. No. 08/052,065, filed Apr. 22, 1993, now U.S. Pat. No. 5,369,099.

TECHNICAL FIELD

This invention relates to a method of growing plants in soil, and more particularly, to a method of using source water to water plants growing in soil while inhibiting the formation of crystalline mineral deposits in the soil.

RELATED APPLICATIONS

This application is a continuation-in-part of our copending application Ser. No. 08/052,065, filed April 22, 1993, and entitled "A Method and Composition for Inhibiting the Formation of Hard Water Deposits on Fruit."

BACKGROUND INFORMATION

A plant growing in soil requires irrigation with water. Irrigation water generally contains deposit forming minerals. Due to the presence of deposit forming minerals, irrigation of a plant results in the formation of crystalline mineral deposits in the soil which are virtually impervious to water. Such crystalline mineral deposits in soil can be detrimental to a plant growing in the soil and the future usefulness of the soil. As crystalline mineral deposits accumulate in the soil, irrigation water is diverted around the deposits, resulting in channeling of the water in the soil. As irrigation water begins to channel through the soil, a majority of the water is often channeled away from the root system of the plant resulting in a larger amount of irrigation water being required to provide moisture to the root system of the plant. The creation of larger flows of water in some areas of the soil than in others results in erosion of part of the soil. Further, crystalline mineral deposits can form a sublayer of virtually impervious deposits in the soil which inhibit the root system of a plant from penetrating past the sublayer to the deeper soil. When the root system of a plant does not penetrate deeply into the soil, the plant is weakened. Finally, crystalline mineral deposits make the soil difficult to cultivate.

DISCLOSURE OF THE INVENTION

The present invention provides a method of growing a plant in soil. The method includes providing water containing crystalline deposit forming minerals. A mixture is formed by admixing an effective amount of 1-hydroxyethane 1,1-diphosphonic acid (HEDPA) with the water. The HEDPA is present in an amount sufficient to alter the crystalline deposit forming minerals such that following evaporation of the water, substantially all of the crystalline deposit forming minerals form an amorphous powder. The mixture is applied to soil in which roots of a plant are growing. The water is allowed to evaporate from the soil such that substantially all of the crystalline deposit forming minerals form an amorphous powder.

Preferably, the effective amount of 1-hydroxyethane 1,1-diphosphonic acid (HEDPA) is at least about ¼ ppm. In a more preferred form of the invention, the effective amount of HEDPA is between about ¼ ppm and about 5 ppm. In an even more preferred embodiment of the invention, the effective amount of HEDPA is about 2 ppm.

These and other advantages and features will become apparent from the detailed description of the best mode for carrying out the invention that follows.

BEST MODE FOR CARRYING OUT THE INVENTION

When a plant growing in soil is irrigated with water which contains deposit forming minerals, crystalline mineral deposits form in the soil after the water has evaporated. The crystalline mineral deposits are substantially impervious to water, resulting in later applied irrigation water flowing around the deposits. Thus, the channeling prevents the water from percolating throughout the soil to provide uniform irrigation to the root system of the plant. This redirection of irrigation water forms channeling in the soil which can result in erosion of the soil. Over a period of time, a sublayer of crystalline mineral deposits may form which is difficult for the root systems of the plant to penetrate. If the root system is unable to penetrate the sublayer, the root systems may extend horizontally across the top of the sublayer, resulting in a plant which is structurally weaker and more vulnerable to temperature changes. Another side effect of accumulation of crystalline mineral deposits is that the soil becomes very difficult to cultivate. Herein, the term "plant" refers to any type of plant, such as a tree, shrub, flower, herb, vine, or grass. Herein "soil" refers to a medium for growing plants, whether situated in containers or in a field.

Generally, irrigation water is supplied from sources such as wells, rivers, and lakes. Such water is termed "source water." Source water is generally hard, referring to the presence of any or all of the following in the water: calcium, iron, silicate, magnesium, sodium chloride, sodium bicarbonate, sulphate, nitrates, and fluoride. The amount of hardness of water is measured in parts per million (ppm). Typically source water has a hardness between about 20 ppm to about 450 ppm. When soil is irrigated with hard water, crystalline mineral deposits form in the soil which can be detrimental to the crop growing in the soil and the use of the soil for future crops.

According to the present invention, an effective amount of HEDPA is admixed to the irrigation water. As crops growing in soil are irrigated with the water which includes HEDPA, an amorphous powder is formed in the soil. The amorphous powder is permeable by water, enabling irrigation water to percolate through the soil and provide uniform moisture to the crop growing in the soil. In addition, the soil remains loose, thus easily cultivated or penetrated by a plant's root system. HEDPA is an alkyl diphosphonate. A commercially available form of HEDPA is termed 1-hydroxyethane 1,1-diphosphonic acid and has the following structure:

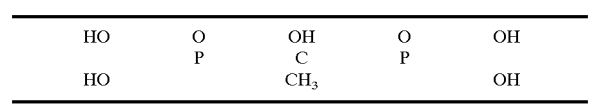

Herein HEDPA is used to describe a number of behave alike alkyl diphosphonates of the basic structure:

| HO | O | R | O | OH |
|----|---|---|---|----|
|    | P | C | P |    |
| HO |   | R'|   | OH |

The following is a list of known HEDPA variants and their structures which indicate what constitutes and may be represented by —R and R':

| HO | O   | H   | O | OH | |
|----|-----|-----|---|----|-|
|    | P   | C   | P |    | methylene diphosphonic acid (MDP) |
| HO |     | H   |   | OH | |
| HO | O   | OH  | O | OH | |
|    | P   | C   | P |    | hydroxymethylene diphosphonic acid (HMDP) |
| HO |     | H   |   | OH | |
| HO | O   | Cl  | O | OH | |
|    | P   | C   | P |    | dichloromethylene diphosphonic acid (Cl$_2$MDP) |
| HO |     | Cl  |   | OH | |
| HO | O   | OH  | O | OH | |
|    | P   | C   | P |    | hydroxycyclohexylmethylene diphosphonic acid (HCMDP) |
| HO |     |     |   | OH | |
| HO | O   | OH  | O | OH | |
|    | P   | C   | P |    | 1-hydroxyethylidene diphosphonic acid (HEDPA) |
| HO |     | CH$_3$ |   | OH | |
| HO | O   | OH  | O | OH | |
|    | P   | C   | P |    | 1-hydroxy-3aminopropane 1,1-diphosphonic acid (ADP) |
| HO | CH$_2$ | CH$_2$ | NH$_2$ | OH | |

An effective amount of HEDPA may be provided in the irrigation water mixture when there is as little as ¼ ppm HEDPA. In some circumstances, additional amounts of HEDPA may be needed. It has been found that the amount of HEDPA which is needed may be increased when the hardness of the irrigation water increases. Seldom is more than 5 ppm HEDPA necessary. In fact, usually no more than 2 ppm is needed. Although, adding additional HEDPA has not been found to negatively impact the scale or deposits in the soil. But, as additional HEDPA is added to irrigation water, the cost of utilizing this invention increases.

The effective amount of HEDPA is added to the irrigation water before the irrigation water is applied to the soil. In a preferred form of the invention, a metering pump is provided and operably attached to the irrigation water feed line. The metering pump is set to feed an effective amount of the HEDPA into the irrigation water. Then, the irrigation water HEDPA mixture is applied to the crop growing in the soil by the use of an irrigation system.

When soil is watered with irrigation water which includes HEDPA, the accumulation of crystalline mineral deposits in the soil is retarded. Similarly formation of a sublayer of crystalline mineral deposit in the soil is retarded. Accordingly, the root system of a plant growing in the soil is able to penetrate deeply into the soil resulting in a structurally sound plant which is more tolerant of variations in temperature. In addition, the soil remains more permeable to water, allowing irrigation water to percolate through the soil and to the root system of the plant without excessive watering. Further, the soil remains easy to cultivate due to the lack of large amounts of crystalline mineral deposits. Also, channeling of irrigation water through the soil is inhibited, reducing erosion of the soil.

The nature and substance of the instant invention as well as its objects and advantages will be more clearly understood by referred to the following specific examples.

EXAMPLE 1

Three hundred milliliters of artificially created hard water (180 ppm total hardness as CaCO$_3$) were added to each of two beakers, beaker 1 and beaker 2. Beaker 1 was untreated while beaker 2 was treated with 5 ppm of HEDPA. The water in the beakers was allowed to evaporate to dryness at 100 to 110° F. The residue in each beaker was observed under a microscope. When magnified (100×) the residue in untreated beaker 1 showed crystalline angular structures, as shown in photograph 1. The crystalline angular structures are considered by the inventors to be crystalline mineral deposits from the deposit forming minerals of the hard water. In contrast, when magnified (100×) the residue in treated beaker 2 showed irregularly shaped amorphous structures, as shown in photograph 2. The amorphous structures are considered by the inventors to be amorphous powder resulting from the reaction of the deposit forming minerals in the hard water with the HEDPA.

EXAMPLE 2

One hundred grams of caliche soil of 20+ mesh were added to each of two beakers, beaker 3 and beaker 4. Three hundred milliliters of artificially created hard water (180 ppm total hardness as CaCO$_3$) were added to each beaker. Beaker 3 was untreated while beaker 4 was treated with 5 ppm of HEDPA. The beakers were thoroughly mixed, and then the water in each beaker was allowed to evaporate to dryness at 100 to 110° F. resulting in a composition of soil deposits from the hard water. Under magnified examination (100×), the soil composition in untreated beaker 3 showed crystalline, angular structures composed of small crystals arranged in a regular pattern, as shown in photograph 3. The crystalline angular structures are considered by the inventors to be crystalline mineral deposits from the deposit forming minerals of the hard water. Under magnified examination (100×), the soil composition in treated beaker 4 showed round, amorphous structures, as illustrated in photograph 4. The amorphous structures are considered by the inventors to be amorphous powder resulting from the reaction of the deposit forming minerals with the HEDPA.

EXAMPLE 3

In order to determine the mechanical strength of the soil composition in each of beakers 3 and 4, a ten gram weight was dropped from a height of eight inches above the soil composition in each beaker. No affect was shown in either beaker.

EXAMPLE 4

Example 3 was repeated using 20 gram weights. A small portion of the soil composition in untreated beaker 3 was displaced by the 20 gram weight. A larger amount of the residue in treated beaker 4 was displaced by the 20 gram weight.

EXAMPLE 5

Example 3 was repeated using 50 gram weights. When the weight was dropped on the soil composition in untreated beaker 3, a firm "thud" type sound was heard and there was displacement of the residue in the beaker. When the weight was dropped on the soil composition in treated beaker 4, a muffled thud was heard and there was a large displacement of the residue in the beaker.

EXAMPLE 6

Example 3 was repeated using 147.5 gram weights. The soil composition in untreated beaker 3 displayed an area of disturbance upon impact of the 147.5 gram weight. The soil composition in treated beaker 4 completely disrupted upon the impact of the 147.5 gram weight, resulting in a scattering of the soil composition.

EXAMPLE 7

Container 1 and container 2, each with drainage holes in the bottom, were filled with soil. The containers were placed under a 250 watt heat lamp. Sprayers were hung over each container. The sprayers operated on a ten minute cycle timer, calibrated to deliver 0.33 gallons of water per hour. The sprayers were to set to spray for one minute and dry for nine minutes. The spraying cycle continued twenty-four hours a day for twenty-one days. Container 1 was sprayed with hard water (180 ppm total hardness as $CaCO_3$). Container 2 was sprayed with hard water (180 ppm total hardness as $CaCO_3$) plus 5 ppm HEDPA. After twenty-one days, the containers were placed in an oven operating at 150° F. and allowed to dry for two days. Then, an initial 500 milliliters of water were simultaneously poured over each container. The water passing through each container was monitored for speed as well as quantity. Three minutes after the initial 500 milliliters had been poured, no water had passed through untreated container 1. 25 milliliters had passed through treated container 2. Then, a second 500 milliliters of water were simultaneously poured over each container. Water began to pass through the container 1 and container 2. After three minutes from the second pouring, 90 milliliters of water had passed through untreated container 1 and 130 milliliters had passed treated container 2.

EXAMPLE 8

Container 1 and container 2 were inverted. Untreated container 1 showed the formation of channels through the soil with most of the moist soil being around the edges of the container. Treated container 2 show more even patterns of absorption with most of the moist soil located on the top area of the container.

While specific embodiments of the present invention have been shown and described in detail to illustrate the utilization of the inventive principles, it is to be understood that such showing and description have been offered only by way of example and not by way of limitation. Protection by Letters Patent of this invention in all its aspects are set forth in the appended claims. The scope of the appended claims is to be interpreted as the broadest scope that the prior art allows.

What is claimed is:

1. A method of growing a plant, comprising:

providing soil that does not contain crystalline mineral deposits that are impervious to water;

establishing a plant in said soil, and irrigating said plant and soil with irrigation water that contains crystalline deposit forming minerals and 1-hydroxyethylidene-1-diphonic acid (HEDPA), wherein said 1-hydroxyethylidene-1-diphonic acid (HEDPA) is present in the water in an amount sufficient to alter the crystalline deposit forming minerals in the water such that following evaporation of the water the crystalline deposit forming minerals that were in the water will exist in the soil in the form of an amorphous powder that is permeable to water, enabling additional irrigation water to percolate through the soil, and also resulting in the soil remaining loose, so as to be easily cultivated and easily penetrated by the plant's root system as the plant grows.

2. The method of claim 1, wherein said sufficient amount of 1-hydroxyethane 1,1-diphosphonic acid (HEDPA) is between about ¼ ppm and about 5 ppm.

3. The method of claim 2, wherein said sufficient amount of 1-hydroxyethane 1,1-diphosphonic acid (HEDPA) is about 2 ppm.

4. The method of claim 2, wherein said sufficient amount of 1-hydroxyethane 1,1-diphosphonic acid (HEDPA) is about 5 ppm.

* * * * *